(12) United States Patent
Muskin (10) Patent No.: US 7,762,880 B2
(45) Date of Patent: *Jul. 27, 2010

(54) VIDEO POKER GAME WITH A BET DOUBLING OPTION

(75) Inventor: Jon Muskin, Philadelphia, PA (US)

(73) Assignee: Olympian Gaming LLC, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/426,336

(22) Filed: Apr. 20, 2009

(65) Prior Publication Data

US 2009/0291729 A1 Nov. 26, 2009

Related U.S. Application Data

(62) Division of application No. 10/689,027, filed on Oct. 21, 2003, now Pat. No. 7,520,807.

(51) Int. Cl.
*A63F 9/24* (2006.01)

(52) U.S. Cl. .......................... 463/13; 463/25

(58) Field of Classification Search .............. None
See application file for complete search history.

(56) References Cited

U.S. PATENT DOCUMENTS

| | | | |
|---|---|---|---|
| 6,206,780 B1 * | 3/2001 | Awada | 463/13 |
| 6,368,214 B1 * | 4/2002 | Luciano | 463/18 |
| 7,201,654 B1 * | 4/2007 | Jarvis et al. | 463/13 |

* cited by examiner

*Primary Examiner*—Ronald Laneau
*Assistant Examiner*—Tramar Harper
(74) *Attorney, Agent, or Firm*—Muskin & Cusick LLC (57) ABSTRACT

A method, apparatus, and computer readable storage medium for implementing a video poker game allowing a player to double (or increase) his or her initial bet. After the initial deal, the player can decide to double the initial bet before drawing new cards. Both the initial bet and optional doubled bet are paid to the player.

7 Claims, 6 Drawing Sheets

FIGURE 1

FIGURE 2 coins in: 5

| | | | |
|---|---|---|---|
| ROYAL FLUSH | 4000 | 0 | |
| STRAIGHT FLUSH | 250 | 0 | |
| 4 OF A KIND | 125 | 2125 | |
| FULL HOUSE | 45 | 542 | 300 |
| FLUSH | 30 | 0 | |
| STRAIGHT | 20 | 280 | |
| 3 OF A KIND | 15 | 48 | |
| 2 PAIR | 10 | 20 | |
| JACKS OR BETTER | 5 | 5 | |

5

$1106 return=0.9899

VIDEO POKER GAME WITH A BET DOUBLING OPTION

CROSS REFERENCE TO RELATED APPLICATIONS

This Application is a Divisional Application of U.S. application Ser. No. 10/689,027, now allowed, filed in the USPTO on Oct. 21, 2003, now U.S. Pat. No. 7,520,807, which is incorporated by reference herein in its entirety for all purposes.

BACKGROUND OF THE INVENTION

1. Field of the Invention

The present invention is directed to a method, device, and computer readable storage medium for implementing a video poker game which provides a player with an ability to increase an initial bet, double, or place an additional bet.

2. Description of the Related Art

Video poker is a popular gambling game found in casinos.

What is needed is a new variety of the game that can be more profitable for the casino, as well as in a form that some players may prefer over the standard game.

SUMMARY OF THE INVENTION

It is an aspect of the present invention to provide improvements and innovations in video poker games, which increase player enjoyment and casino profitability.

The above aspects can be obtained by a method that includes (a) receiving an initial bet; (b) dealing a first hand of cards to a player; (c) allowing the player to select any number of cards to discard; (d) offering an option for the player to make a second bet; (e) replacing the selected cards to form a final hand; (f) determining a rank of the final hand; (g) paying the initial bet according to the rank; and (h) paying the second bet according to the rank, if the player chose to make the second bet.

The above aspects can also be obtained by a method that includes (a) calculating probabilities for being dealt each rank of a plurality of ranks; and (b) dividing the calculated probabilities by a number of possible paying ranks to obtain payouts for each rank.

The above aspects can also be obtained by a method that includes (a) automatically calculating probabilities for an occurrence of each of a series of events; and (b) automatically dividing the calculated probabilities by a number of events with greater than 0 probability to obtain payouts for each respective event.

The above aspects can also be obtained by a method that includes (a) implementing a video poker game, with the additional feature of allowing a player to place an additional bet after being dealt the initial cards; and (b) paying the additional bet based on a computed paytable based on the player's initial cards.

The above aspects can also be obtained by a computer readable storage that performs (a) implementing a video poker game, with the additional feature of allowing a player to place an additional bet after being dealt the initial cards; and (b) paying the additional bet based on a computed paytable based on the player's initial cards.

The above aspects can also be obtained by a system that includes (a) a processing unit implementing a video poker game, with the additional feature of allowing a player to place an additional bet after being dealt the initial cards; and (b) a paying unit paying the additional bet based on a computed paytable based on the player's initial cards.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Reference will now be made in detail to the presently preferred embodiments of the invention, examples of which are illustrated in the accompanying drawings, wherein like reference numerals refer to like elements throughout.

The present invention relates to video poker games and improvements thereof. The present invention provides for a video poker game that allows the player to double (or just increase) his or her bet.

The most common form of video poker found in casinos operates as follows. A player pays to play the game. Five cards are then dealt. The player can then choose to discard any number of the five cards, which are then replaced to form a final hand. A rank of the final hand is determined, and is paid according to a paytable.

To add excitement to the game, the present invention affords the player an option to adjust his bet after the initial cards have been dealt. Of course, some type of alteration of the game is needed to accommodate this player advantage without the player gaining an advantage over the casino.

In the preferred embodiment of the present invention, the game can be played as the standard game described above. A "double your bet" button is also active after the initial deal and allows the player to optionally double (or just increase) the player's bet after the initial cards have been dealt.

Two paytables can be used. A first paytable is a standard paytable used to pay out the original bet. A second paytable is displayed which automatically adjusts payouts immediately based on cards the player wishes to hold and discard. The payouts are calculated so that the house has an advantage of the house's choosing. If the player chooses the double, then the player's original bet can be paid according to the first paytable and the additional portion of the bet can be paid according to the second paytable.

Figure 1:
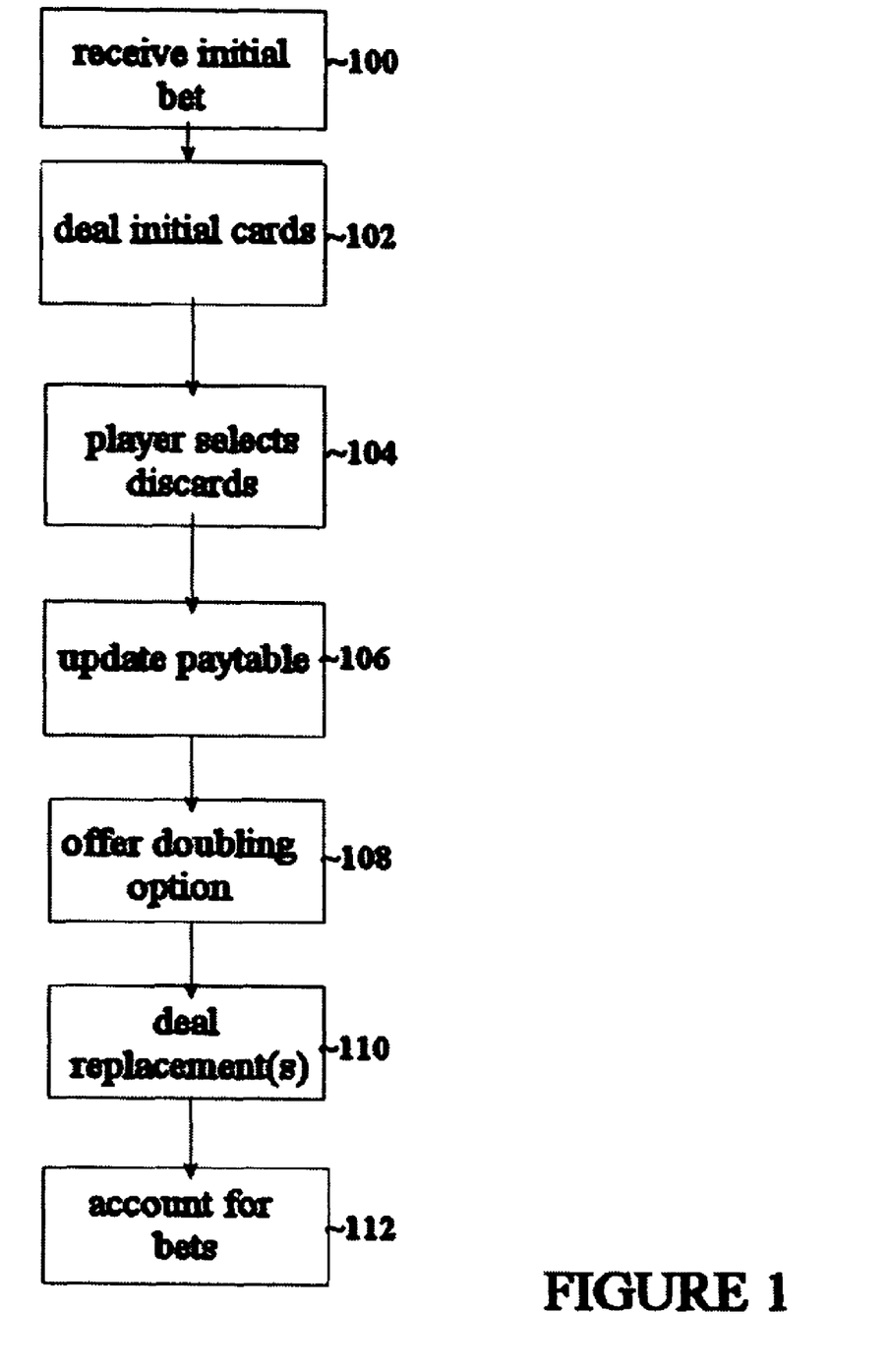
FIG. 1 is a flowchart illustrating a basic method of the present invention, according to an embodiment of the present invention.

FIG. 1 is a flowchart illustrating a basic method of the present invention, according to an embodiment of the present invention.

The game typically begins with operation 100, where a video poker machine or electronic gaming device (EGD) receives the player's initial bet.

After the bet is received in operation 100, the method proceeds to operation 102 which deals five cards to the player. Of course, other amounts of cards can be used as well, but the standard amount is five.

After the cards are dealt in operation 102, the method proceeds to operation 104 wherein the player selects which cards he or she wishes to discard. This can be done by pointing to the cards on the screen, pressing buttons, etc.

From operation 104, the method proceeds to operation 106 which updates a dynamic paytable based on which cards the player selected to discard (or hold) in operation 104. The dynamic paytable is calculated so typically the house will always have a little advantage regardless of which cards the player chooses to hold. More on this calculation will be discussed below.

From operation 106, the method proceeds to operation 108 which offers a doubling option. The doubling option can be offered by way of a doubling button. The player can choose to press the button and double his or her bet, or just press a standard "draw" button to proceed without doubling.

From operation 108, the method proceeds to operation 110, which then deals replacement cards for the cards which were selected to be discarded to form a final hand.

From operation 110, the method proceeds to operation 112, which accounts for the bets. This is done by determining the rank of the final hand, and paying the initial bet based on a standard paytable. If the player chose to double, then the doubled portion of the bet is paid based on the dynamic paytable.

Figure 2:
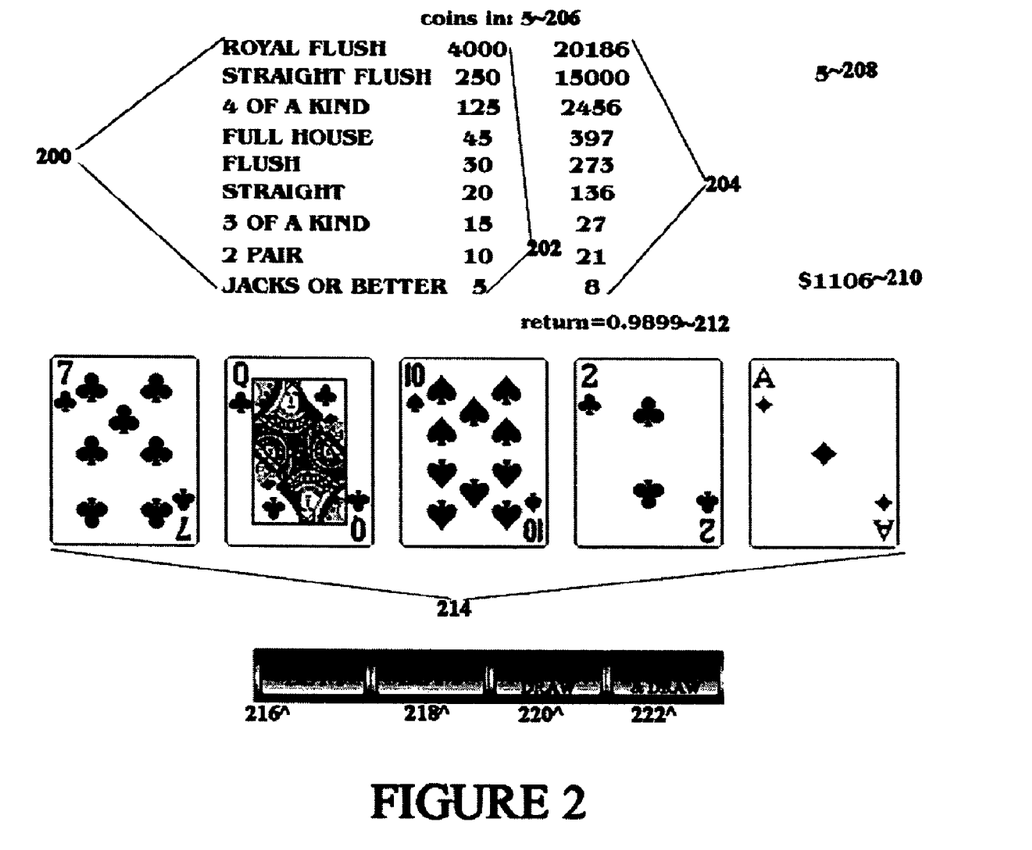
FIG. 2 is a screenshot illustrating a first phase of the invention, according to an embodiment of the present invention.

FIG. 2 is a screenshot illustrating a first phase of the invention, according to an embodiment of the present invention.

The first phase as indicated in FIG. 2 corresponds to operation 102 from FIG. 1. A player has already placed his or her bet of five coins.

A rank list 200 displays winning hand ranks. Paytable 1 202 displays award amounts for the initial bet, for each respective rank from the rank list 200. Paytable 2 204 displays award amounts for an additional bet.

A first coin in display 206 indicates how many coins were bet. A second coin in display 208 also displays how many coins were bet. A balance display 210 displays the player's total balance (how much money he has). A return display 21-2 displays the computed return for paytable 2 204. It is preferred that the return display 212 not be used in an actual public game, as it may distract players.

A first hand 214 is displayed which is the hand where the player's goal is to make one of the winning hand ranks in the rank list 200. A bet 1 button 216 allows the player to bet 1 coin, and a bet 5 button 218 allows the player to quickly bet 5 coins. The bet 1 button 216 and the bet 5 button 218 are typically not active after the player has already placed his bet. A deal/draw button 220 both allows the player to deal the initial cards after indicating how many coins to bet, and then draw cards after the player has selected the discards. In this phase of the game, the deal/draw button 220 serves the latter operation. A double and draw button 222 allows the player to double the player's bet and then draw cards. At this phase in the game, the deal/draw button 220 and the double and draw button 222 are both active, and the player can choose whether to just draw new cards or double his or her bet and draw new cards.

Paytable 2 204 can also be considered a "dynamic paytable," because it immediately updates the listed payouts based on certain conditions. In this case, when particular cards are selected to be held, the paytable 2 automatically updates the payouts to reflect odds for forming each respective rank. In FIG. 2, none of the cards are selected to be held, so paytable 2 204 reflects payouts for discarding and redrawing all 5 cards.

Figure 3:
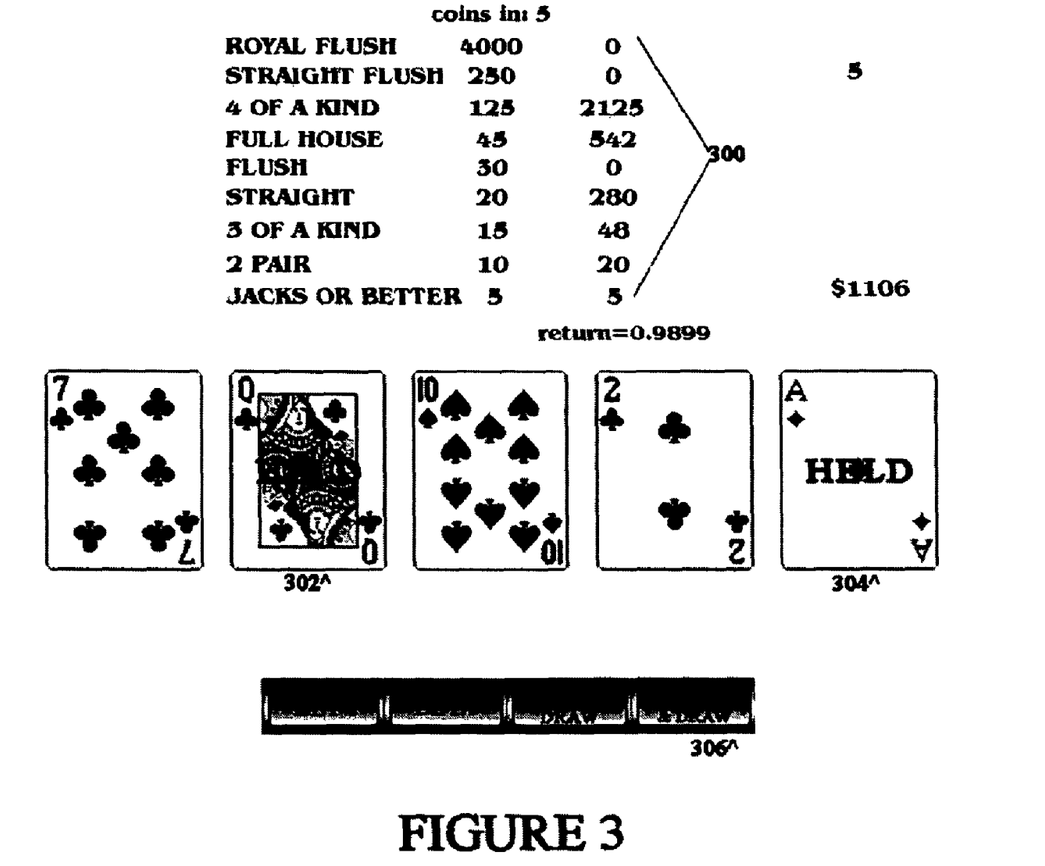
FIG. 3 is a screenshot illustrating the dynamic paytable, according to an embodiment of the present invention.

FIG. 3 is a screenshot illustrating the dynamic paytable, according to an embodiment of the present invention.

FIG. 3 corresponds to operations 104 and 106 from FIG. 1, and follows FIG. 2. The difference in play from FIG. 2 and FIG. 3, is the player has selected to hold a queen of clubs 302 and an ace of diamonds 304.

Note that paytable 2 300 has changed from its form from FIG. 2 (item 204). This is because these new payouts reflect that the player has decided to hold the queen of clubs 302 and the ace of diamonds 304.

Note that certain payouts are not active in paytable 2 300. For example, royal flush, straight flush, and flush all pay an amount of zero. This is because these hands are impossible to make considering the cards being held. The player can experiment by selecting different cards to hold and viewing the updated paytable 2 300.

Figure 4:
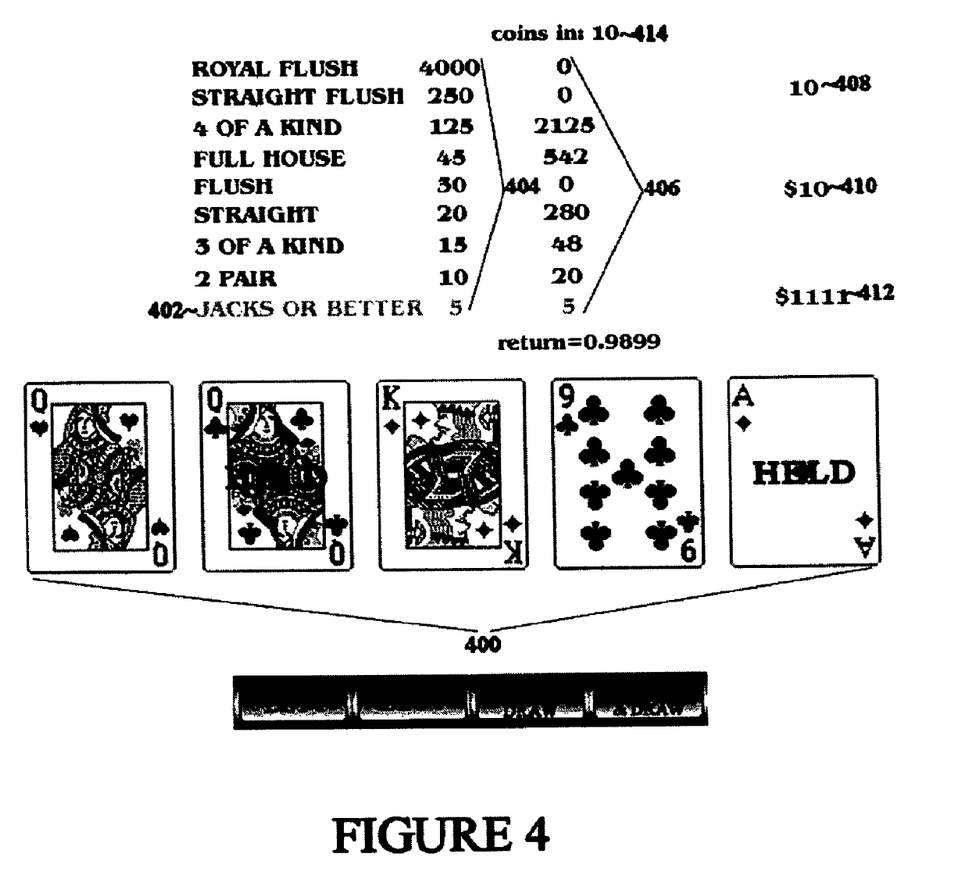
FIG. 4 is a screenshot illustrating a final phase of the invention, according to an embodiment of the present invention.

FIG. 4 is a screenshot illustrating a final phase of the invention, according to an embodiment of the present invention.

FIG. 4 corresponds to operation 108 from FIG. 1, and is the result of pressing the double and draw button (item 222 from FIG. 2) from the state displayed in FIG. 3. Since the player doubled his or her initial bet of 5, the new amount of coins bet is 10, which is displayed in the coin bet display 408.

The cards that were not selected to be held are replaced by newly dealt cards to form a second hand 400. Note that the second hand 400 includes a pair of queens, but no other winning combinations, thus this hand is considered to be a "jacks or better" rank.

A rank highlight 402 highlights a winning rank and wining payouts in one or both of paytable 1 404 and paytable 2 406. Paytable 1 404 indicates a winning amount of 5 for the rank of jacks or better. Paytable 2 406 also indicates a winning amount of 5 for the rank of jacks or better. Since the player chose to double his or her bet, the player receives payouts from both paytable 1 404 and paytable 2 406.

Thus, the player wins the sum of the two payouts which is $10, which is displayed in the win display 410. The balance display 412 reflects the win of $10. Since the player wagered $10 and won $10, the player has broke even on this transaction and can now start a new game.

The additional wager is not limited to double of the original bet, but can also comprise any amount of coins (or any fraction) bet the player wishes. Of course, the payouts on the additional bet are based on the number of respective coins bet.

Figure 5:
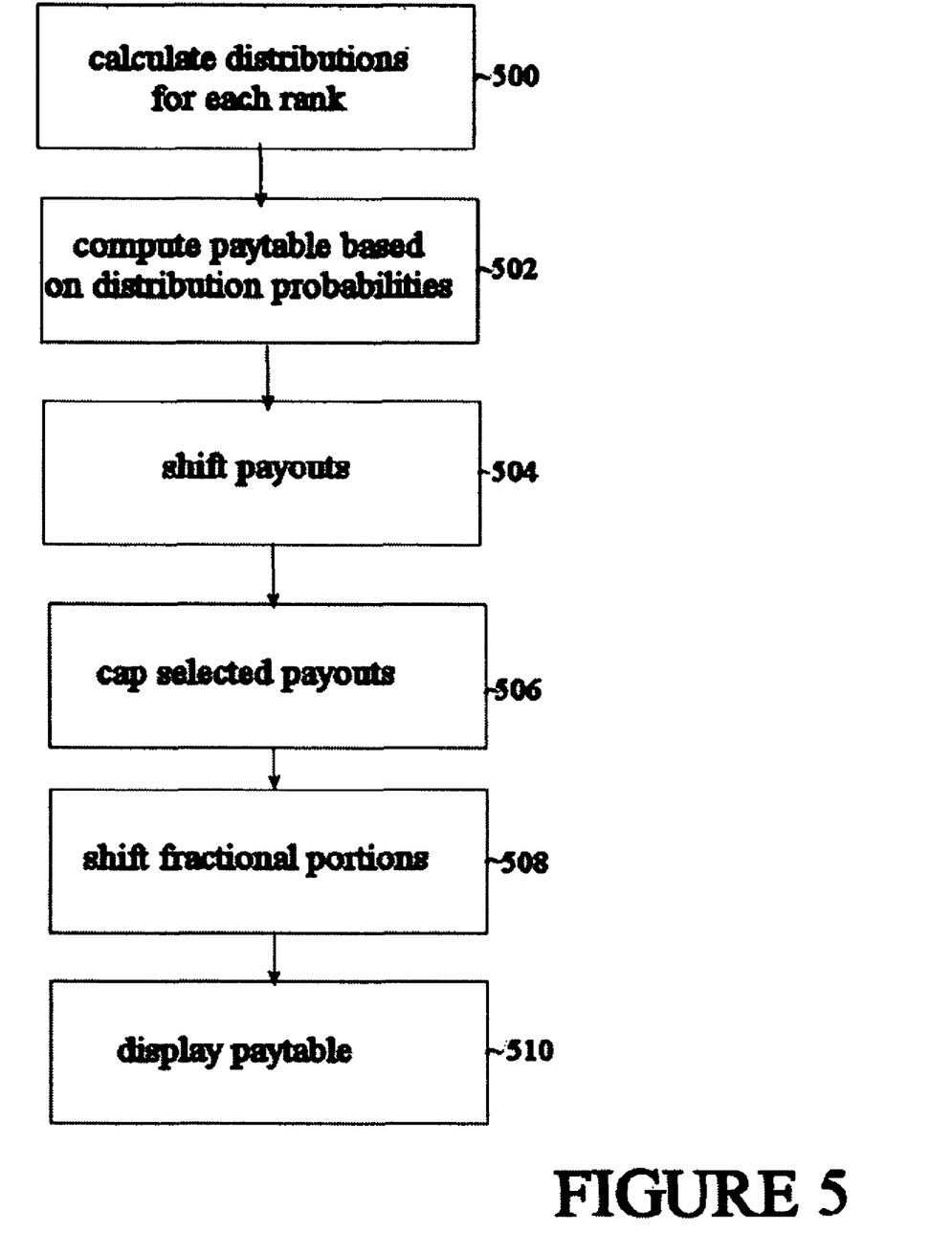
FIG. 5 is a flowchart illustrating a method for computing the dynamic paytable, according to an embodiment of the present invention.

FIG. 5 is a flowchart illustrating a method for computing the dynamic paytable, according to an embodiment of the present invention.

The method starts with operation 500, which calculates distributions for each rank. This can be done using a "formulaic" approach. Based on the cards that are selected by the player, and cards remaining in the deck, the number of possible hand of each rank can be determined by counting the number of ways to make each particular rank.

For example, consider a player playing Jacks or Better at the 25 cent coinage level and plays 5 coins. The player is dealt the following cards: 2 of hearts, 4 of spades, 8 of hearts, 9 of clubs, queen of spades. The player decides to hold just the queen of spades. The following is how the number of ways to make each rank can be tabulated formulaically.

Royal flush: The 10, jack, king, and aces of spades are all still in the deck, therefore there is 1 royal flush combination.

Straight flush: The possible spans for a straight flush are 8 to queen and 9 to king. All necessary cards are still in the deck, therefore number of combinations is 2.

Four of a kind: For the ranks 3, 5, 6, 7, 10, jack, king, and ace all four cards are still in the deck, therefore there is one combination each for a total of 8. All three other queens are also still in the deck and the player can still get any of the 44 kickers with the three queens. So the number of four of a kinds is 8+44=52.

Full house: The queen can be either part of the three of a kind or pair. If the queen is part of the three of a kind then there are 3 ways to pick 2 queens from the remaining 3. There are 12 ranks left for the pair. 8 of them have all four cards left and 4 have just three left. Of the ranks with all four cards left there are 6 ways to choose 2 cards out of 4. Of the 4 ranks with 3 left there are 3 ways to choose 2 cards out of 3. So the total number of full houses, queens up, is 3*(8*6+4*3)=180. For the number of full houses where the queen is part of the pair there are 3 ways to choose one more queen out of the three left. Of the other 12 ranks there are 4 ways to choose 3 out of 4 cards for the 8 ranks with all four cards remaining. Of the other 4 ranks with 3 cards left there is only 1 way to pick 3 out of 3 cards. So the number of full houses where the queen is the pair is 3*(8*4+4*1)=108. So the total number of full houses is 180+108=288.

Flush: Spades are the only possible suit for the flush. The player discarded the 8 of spades so there are 11 spades left in the deck. There are 330 ways to pick 4 spades out of 11 to complete the flush. However 3 of those will result in a straight flush or royal flush. So the number of flush combinations is 330-3=327.

Straight: There are three possible spans for a straight: 8 to queen, 9 to king, and 10 to ace. The player already discarded an 8 and 9, which will cut down the number of straight combinations. Let n8=number of 8's left in deck, and so on for each rank. The number of possible straights can be expressed as: $n8*n9*n10*nJ+n9*n10*nJ+nK+n10*nJ+nK+nA=3*3-4*4+3*4*4+4+4*4*4=592$. However 3 of these combinations result in a straight flush or royal flush. So the final number of straight combinations is 592-3=589.

Three of a kind: There are two types of three of a kind in this situation: (1) queen is in the three of a kind, (2) queen is a singleton. To determine the number of type (1) three of a kind there are 3 ways to pick 2 out of the three queens left in the deck. There are also 44 non-queens left in the deck. The number of ways to pick 2 cards out of 44 is 44*43/2=946. However we know from the full house section that 8*6+4*3 that 60 of these combinations result in a pair. So there are 3*(946−60)=2658 ways to form a type (1) three of a kind. For the type (2) full houses there are 12 ranks left for the three of a kind, and 11 for the other singleton. The program would circulate through all 132 combinations of three of a kind and singleton ranks. 4*3=12 will result in both ranks having only three cards left, in which case there will be 1*3=3 ways to complete the three of a kind. 8*4=32 ways will result in the 3 of a kind coming from a rank with all 4 cards left and the singleton from a rank with 3. Then there were will be 4*3=12 ways to complete the three of a kind. 4*8=32 ways will result in the three of a kind coming from a rank with 3 cards left and the singleton from a rank with 4 cards left. There are 1*4=4 ways to complete the three of a kind. 8*7=56 ways will result in both the three of a kind and the singleton coming from ranks with all four cards left. There will be 4*4=16 ways to complete each three of a kind. So the total number of type (2) three of a kinds is (12*3+32*12+32*4+56*16)=1444. The total number of three of a kinds is 2658+1444=4102.

Two pair: There are two types of two pairs: (1) queen is part of a pair, (2) queen is the singleton. Of the type (1) two pairs there are 3 possible ranks for the other queen. There are 8*7=56 ways the other pair and singleton can both come from ranks with 4 cards left, for a total of 6*4=24 combinations each. There are 8*4=32 ways the three of a kind can come from a rank of 4 and the singleton from a rank of 3, for a total of 6*3=18 each. There are 4*8=32 ways the three of a kind can come from a rank of 3 and the singleton from a rank of 4, for a total of 3*4=12 combinations each. There are 4*3=12 ways both the other pair and the singleton can come from ranks with 3 left each, for a total of 3*3=9 combinations each. So the total number of type (1) two pairs is 3*(56*24+32*18+32*12+12*9)=7236. Of the type (2) two pairs there are 8*7/2=28 ways both pairs can come from ranks 4, and there are 6*6 ways to pick the suits from each set. There are 8*4=32 ways to pick one pair from a rank of 4 and one from a rank of 3, and there are 6*3=18 ways to pick the suits from each set. There are 4*3/2=6 ways to pick both pairs from ranks of 3, and there are 3*3=9 ways to pick the suits from each set. So the total number of type (2) two pairs is (28*36+32*18+6*9)= 1638. The total number of two pairs is therefore 7236+1638=8874.

Pair: There are two types of pairs: (1) pair of queens, (2) pair of another high card. For the type (1) pairs the program picks one of 3 suits for the other queen and then will cycle through all 12*11*10/6=220 ways to pick 3 ranks out of 12 for the singletons. 8*7*6/6=56 of those ways will result in all 3 singletons coming from ranks of 4, for 4^3=64 ways to pick the suits each. (8*7/2)*4=1 12 of those ways will result in 2 singletons coming from ranks of 4 and one from a rank of 3, for 4^2*3=48 ways to pick the suits each. 8*(4*3/2)=48 of those ways will result in 1 singleton coming from a rank of 4 and two from a rank of 3, for 4*3^2=36 ways to pick the suits. 4*3*2/6=4 ways result from all three singletons coming from ranks of 3, or 3^3=27 ways to pick the suits. So the number of type (1) pairs is 3*(56*64+112*48+48*36+4*27)=32388 combinations of type (1) pairs. For the type (2) pairs there are 3 ranks to choose from for the other pair. All three ranks have all four cards left so each has 4*3/2=6 ways to arrange the suits. There are 11*10/2=55 ways to pick the ranks of the other two singletons. 7*6/2=21 ways result in both singletons from ranks of 4, for 4^2=16 ways to pick the suits. 7*4=28 ways result in one singleton from a rank of 4 and one from a rank of 3, for 4*3=12 ways to pick the suits. 4*3/2=6 ways result in both singletons from ranks of 3, for 3^2=9 ways to pick the suits. So the number of type (2) pairs is 3*6*(21*16+28*12+6*9)=13068. The total number of pairs is 32388+13068=45456.

Non-paying hand: There are 47*46*45*44/24=178365 ways to pick 4 replacement cards out of 47 left in the deck. The total number of paying combinations is 59691, adding up the totals for each type of hand. 178365−59691=118674 ways to have a non-paying hand.

The above method can be implemented when the player holds 0, 1, 2, 3, or 4 cards. Alternatively, a "cycling" method can also be used which deals every possible card combination from the deck and tabulates how many possible ranks can be made. This can be considered a "slow" approach, and is recommended when the player decides to hold 4 cards, thus there are only 47 remaining cards to cycle through and tabulate.

Once the number of possible ways to make each rank is determined based on the cards selected, the method then proceeds to operation 502 which computes a paytable based on the distribution probabilities.

The probability of making each rank can be easily computed by dividing by the number of possible ways to make a rank (computed in operation 500) by the number of possible hands that can be made for the given number of discards. Table I illustrates the number of cards held and how many possible hands can be made.

TABLE I

| # cards held | # hand combinations |
|---|---|
| 0 | 1,533,939 |
| 1 | 178,365 |
| 2 | 16,215 |
| 3 | 1,081 |
| 4 | 47 |
| 5 | 1 |

The probability of obtaining a certain rank can be determined by dividing the number of ways to make that rank by the number of possible hands (from Table I). Using the above example where the player is dealt: 2 of hearts, 4 of spades, 8 of hearts, 9 of clubs, and the queen of spades, and the player decides to hold the queen of spades (which means 4 discards), the following probability table can be computed:

TABLE II

| Rank | # ways to make | probability | 1/probability |
|---|---|---|---|
| Royal Flush | 1 | .0000056 | 178,571 |
| Straight Flush | 2 | .0000112 | 89,286 |
| 4 of a Kind | 52 | .0002915 | 3,431 |
| Full House | 288 | .000183 | 545 |
| Flush | 327 | .0016 | 63 |
| Straight | 589 | .0033 | 303 |
| 3 of a Kind | 4,102 | .023 | 43 |
| 2 Pair | 8,874 | .0498 | 20 |
| Jacks or Better | 45,456 | .2548 | 3.9 |

In Table II, the I/probability represents a payout for that particular rank, but only if that rank was the only active payout. If a probability for a particular rank is 0, then the payout for that particular rank would be 0 (instead of dividing by 0). Since there are numerous active payouts (9 in Table II), the payouts need to accommodate the others so that overall the paytable does not return more than 100%. To reduce the paytable, the (1/probability) entries can be divided by the number of active paying hands.

For example, in FIG. 2 there are 9 active payouts (if a payout is 0 it is not active). So each (1/probability) column can be divided by 9 to result in viable payouts for a game. Table III illustrates the (1/probability) column in Table II divided by 9.

TABLE III

| Rank | 1/probability | (1/probability)/9 |
|---|---|---|
| Royal Flush | 178,571 | 19841 |
| Straight Flush | 89,286 | 9920.667 |
| 4 of a Kind | 3,431 | 381.22 |
| Full House | 545 | 60.55 |
| Flush | 63 | 7 |
| Straight | 303 | 33.667 |
| 3 of a Kind | 43 | 4.778 |
| 2 Pair | 20 | 2.222 |
| Jacks or Better | 3.9 | .433 |

The (1/probability)/9 column in Table III represents the payout for each rank for 1 coin bet. This number should be multiplied by the number of coins bet. Further, the payouts in Table III represent no house advantage (due to rounding though there might be a slight house advantage/disadvantage). Typically, a casino would work in a house advantage so they were guaranteed to make money from the game. Thus, the following formula can be used to obtain a final payout, considering the house advantage and the number of coins bet:

Payout=((coins*game return)/probability of achieving hand)/# of paying hands

The game return should preferably set to 0.99 (99%) so that the player would consider the doubling bet a good bet and make it frequently. However, the casino (or game manufacturer) is free to choose whatever game return they wish. Table IV represents the payouts for each rank, and is computed by multiplying Table III by (coins*game return).

TABLE IV

| Rank | ((coins * game return)/probability of achieving hand)/# of paying hands |
|---|---|
| Royal Flush | 98212.95 |
| Straight Flush | 49107.30 |
| 4 of a Kind | 1887.039 |
| Full House | 299.72 |
| Flush | 34.65 |
| Straight | 166.65 |
| 3 of a Kind | 23.65 |
| 2 Pair | 11 |
| Jacks or Better | 2.14 |

The paytable in Table IV is a mathematically proper paytable for the above described conditions. However, some adjustments can optionally be made to enhance the player's gambling experience, and to also accommodate casino preferences. Players do not wish to lose their money too quickly. If players lose too quickly, they will be discouraged and not continue playing or return. Thus, paytables can be shifted to be "bottom heavy." A bottom heavy paytable is one where (probability*payout) for ranks are higher towards the bottom of the paytable than the top. Payouts can be shifted from the higher paying hands (less likely) to the lower paying hands (more likely), while preserving the same overall return for the paytable.

Thus, from operation 502, the method proceeds to operation 504 which shifts payouts.

An algebraic formula can be derived to shift payouts while preserving the same overall return. Table V illustrates an example of a simple paytable.

TABLE V

| Rank | probability | payout |
|---|---|---|
| rank1 | a | x |
| rank2 | b | y |
| rank3 | c | z |

Consider the paytable in Table V to have an even return (1) for simplicity. Now suppose that it is desired to reduce the payout for rank1 by a "shrinking factor" of s, and preserve the same return by increasing rank 2 by a "growth factor" f. Table VI represents what such an adjust paytable would look like.

TABLE VI

| Rank  | probability | payout |
|-------|-------------|--------|
| rank1 | a           | s * x  |
| rank2 | b           | f * y  |
| rank3 | c           | z      |

If the paytable in Table V has an even return (1), then the following relationship can be stated:

$a*x+b*y+c*z=1$

The following relationship can be stated from the paytable in Table VI:

$a*s*x+b*f*y+c*z=1$

Using the above two equations and solving for f, we obtain:

$f=(a*x-b*y-a*s*x)/(b*y)$

Thus, if we want to shift 50% of the payout in rank 1 to rank 2, the payout for rank 1 can be multiplied by 0.50, and to compensate, the payout in rank 2 can be multiplied by f.

In this manner, payouts from the higher paying hands can be transferred to the lower paying hands, to create a more bottom heavy paytable. The source hands, destination hands, and shrinking factor(s) can be set somewhat arbitrarily to suit the designer's preferences.

Optionally, certain dealt hands can be preset to shift payouts in a certain manner. For example, a player is commonly dealt a low pair. When the player is dealt a low pair, the method can automatically shift payouts in a predetermined manner appropriate for the circumstances. For example, 60% of 4 of a kind and 25% of full house can be shifted to two pair and three of a kind, using the shifting methods described above. In this way, the table is shifted to become more bottom heavy without losing the appeal of attractive payouts on the top.

Further adjustments may still be made to the paytable. In some cases, payouts may be too high. For example, a payout for a royal flush using the above formulas may exceed $100,000, even if a portion is shifted to a lower paying hand as discussed above. Even though casinos will profit from the game in the long run, a casino may be reluctant to offer such large payouts. Therefore, large payouts can be capped and a cap excess can be transferred to lower paying hands.

Thus, from operation 504, the method proceeds to operation 506 which caps selected payouts. High payouts can be optionally reduced to predetermined number(s). The loss in payout due to capping should ideally be shifted to another payout.

For example, if a royal flush pays $55,000 according to the above methods, and the casino or operator wishes to cap this payout at $20,000, then the shrinking factor would be as follows:

$s=20,000/55,000$, or cap amount/current payout

Then, by using the formulas above, the excess amount over the cap can be transferred to another hand, preferably a bottom paying hand. It is recommended that the royal flush be capped and straight flush be capped at a lower amount.

The payouts generated by the above methods will typically contain a fractional part. All of the fractional parts for each payout can simply be removed (such as with an INT( ) or FLOOR( ) function), but this will decrease accuracy.

Thus, to improve accuracy, the method proceeds to operation 508, which shifts fractional parts. A preferred method is to shift all of the fractional parts one by one, until no more shifting can be done upon which the fractional part can then be removed. For example, the method can start at the lowest paying payout and shift the fractional part to the next highest payout. From that payout, the fractional part can be shifted again to the next highest payout, and so on, until only the highest payout contains a fractional part. At that point, the fractional part can simply be removed. Since the highest payout is also typically the most unlikely, removing a fractional part of the highest payout would result in the smallest error (deviation from the desired payout return).

In the alternative, instead of shifting the irrational part to the next highest payout, the irrational part can be shifted to the next rank with the next lowest probability, and so on. The shifting of irrational parts can be done using the methods described above.

Once all of the irrational parts are removed, the paytable computing method proceeds to operation 510 which displays the paytable. The above described methods result in generating a dynamic paytable instantaneously.

Further, it is noted the above described methods for automatically generating a paytable are not limited to generating a paytable for a video poker game, but can also be applied to any other game with any type of events. For example, a slot machine can be implemented which instead of using only a fixed paytable, can alter the paytable based on future event probabilities. As yet another example, a dice game can also implement the methods herein, wherein previous rolls of the dice (or other occurrences) can alter probabilities of achieving certain conditions (for example, rolling 4 identical rolls in a row is more likely after two identical rolls have already been rolled). The invention is further not limited to card games, slot machines, and dice games, but can be applied to any other games with occurring events as well.

Appendix A contains code used to implement the entire game and methods described above. The code is written in the ACTIONSCRIPT language, from MACROMEDIA, which is used to program Flash applications. This language is very similar to C (or C++) and can easily be converted to C or any other programming language. This code is included to provide just one example of how the above method can be implemented, as well as to assist one of ordinary skill in the art in implementing the described methods. Of course, many other approaches can be taken as well, in many other different languages.

The routines "fast0", "fast1," "fast2," "fast3," and "slow 4" are the routines that implement the calculating distributions for each rank (operation 500 from FIG. 5). Fast0, fast1, fast2, and fast3 implement the formulaic approach, while slow4 implements the cycling approach. The function "adjustable" first calls the appropriate fast or slow routine, and then implements operation 500-508 illustrated in FIG. 5 (and the accompanying description) to compute the dynamic paytable. The function "showpays" implements operation 510 illustrated in FIG. 5. Other parts of the program are commented and implement the game logic.

It is noted that the dynamic (or second) paytable does not have to include all of the ranks included in the standard paytable used to pay the original wager. The dynamic paytable can also comprise conditions other than ranks indicated in the original paytable, such as other kinds of hands or other conditions. As only one example, such a condition can comprise a hand that makes up only red (or black) cards. Any such hand or condition can be bet on using the methods described herein. Such conditions can be mixed in any manner with paying hands from the original paytable. Thus, the present invention can provide flexibility in adding a secondary bet to the video poker game (or any other type of game).

It is further noted that any of the games described herein can be played with any kind of deck, either standard or non-standard. Wildcards can also be used.

In a further embodiment of the present invention, instead of computing paytables on the fly as discussed above, paytables can be precomputed and stored. The paytables can be indexed based on a condition or conditions. When a paytable is desired, based on the condition(s) the proper paytable can be retrieved, displayed, and used.

In a further embodiment of the present invention, the dynamic paytable does not have to be used, but instead a single paytable can be used to pay both the initial and the second bet. This paytable would be modified to accommodate the player advantage of being able to double his bet so that the casino would still have an advantage. Such a paytable can be computed by guessing at such a table, then running through every possible hand with and without doubling, and taking the highest expectation of each. If the expectation is greater than 1, then the paytable payouts can be reduced. However, the method described above using the dynamic paytable is preferred.

In a further embodiment of the present invention, the secondary bet can be mandatory and/or can be paid for by splitting up the initial bet.

In yet a further embodiment of the present invention, the additional bet can be applied to a multi line version of video poker. If additional hands are being dealt, multiple doubled bets can be collected and applied to the multi hands. For example, if three hands are being played at once on a multi line version, the player pays for 3 hands up front, and if he or she wishes to double then the player can pay for three (or any amount) more additional bets.

Figure 6:
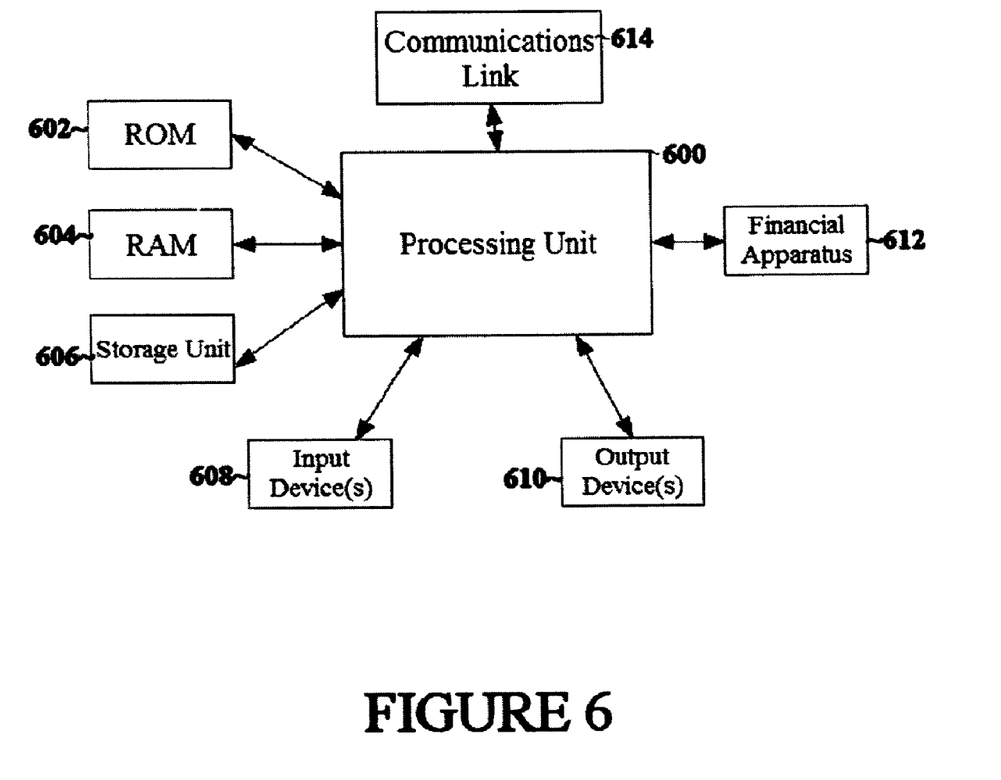
FIG. 6 is a block diagram illustrating one example of hardware that can be used to implement the present invention, according to an embodiment of the present invention.

FIG. 6 is a block diagram illustrating one example of hardware that can be used to implement the present invention, according to an embodiment of the present invention. Typically, an electronic gaming device (EGD) is used to implement the present invention.

A processing unit 600 is connected to a ROM 602, RAM 604, and a storage unit 606 such as a hard drive, CD-ROM, etc. The processing unit 600 is also connected to an input device(s) 608 such as a touch sensitive display, buttons, keyboard, mouse, etc. The processing unit 600 is also connected to an output device(s) 610 such as a video display, audio output devices, etc. The processing unit 600 is also connected to a financial apparatus 612, which can accept payments and handle all facets of financial transactions. The processing unit 600 is also connected to a communications link 614 which connects the gaming device to a casino network or other communications network.

It is also noted that any and/or all of the above embodiments, configurations, variations of the present invention described above can mixed and matched and used in any combination with one another. Any claim herein can be combined with any others (unless the results are nonsensical). Further, any mathematical formula given above also includes its mathematical equivalents, and also variations thereof such as multiplying any of the individual terms of a formula by a constant(s) or other variable.

Moreover, any description of a component or embodiment herein also includes hardware, software, and configurations which already exist in the prior art and may be necessary to the operation of such component(s) or embodiment(s).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. A gaming apparatus, the apparatus comprising:
an input device;
a display device; and
a processing unit configured to operate with the display device and the input device, and configured to execute instructions to perform the following method:
displaying a first paytable comprising ranks and respective first awards;
receiving a first wager;
displaying an initial randomly dealt hand of cards face up to a player;
allowing the player to identify held cards out of the initial hand, wherein cards which are not held cards are discards;
displaying a second paytable comprising secondary awards for respective ranks, the secondary awards automatically updating based on the held cards and discards, each secondary award reflecting respective probabilities of forming each respective rank on a draw based on the held cards and the discards, wherein if the secondary awards are sorted from highest to lowest then their corresponding respective probabilities to form respective ranks on the draw using the held cards and discards are in order from lowest to highest;
performing the draw by replacing the discards in the initial hand to form a final hand, wherein at the draw an award from the first paytable for a particular rank is higher than an award from the first paytable for a specific rank while an award from the second paytable for the particular rank is lower than an award from the second paytable for the specific rank; and
paying the first wager using the first paytable based on the final hand and paying a second wager made by the player before the draw using the second paytable based on the final hand.

2. The apparatus as recited in claim 1, wherein a sum of: the secondary awards multiplied by each secondary award's respective probability of occurring after the draw based on the held cards and discards is a predetermined number.

3. The apparatus as recited in claim 1, wherein if the held cards comprise a winning rank on the first paytable, then a secondary award for the winning rank is automatically deactivated on the second paytable.

4. The apparatus as recited in claim 1, wherein at the draw, the player identifies only one card as held cards in the initial hand.

5. The apparatus as recited in claim 1, wherein at the draw, the player identifies only two cards as held cards in the initial hand.

6. The apparatus as recited in claim 1, wherein at the draw, the player identifies only three cards as held cards in the initial hand.

7. The apparatus as recited in claim 1, wherein at the draw, the player identifies only four cards as held cards in the initial hand.

* * * * *